(12) United States Patent  
Biewer (10) Patent No.: US 11,975,589 B2  
(45) Date of Patent: May 7, 2024

(54) STEERING SYSTEM (71) Applicant: SAF-HOLLAND GmbH, Bessenbach (DE)

(72) Inventor: Frederik Biewer, Haibach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 0 days.

(21) Appl. No.: 17/759,885

(22) PCT Filed: Feb. 11, 2021

(86) PCT No.: PCT/EP2021/053336  
§ 371 (c)(1),  
(2) Date: Aug. 1, 2022

(87) PCT Pub. No.: WO2021/160739  
PCT Pub. Date: Aug. 19, 2021

(65) Prior Publication Data  
US 2023/0076851 A1   Mar. 9, 2023

(30) Foreign Application Priority Data  
Feb. 13, 2020   (DE) ..................... 10 2020 103 762.7

(51) Int. Cl.  
*B60G 7/02* (2006.01)  
*B60G 7/00* (2006.01)  
*B60G 11/26* (2006.01)

(52) U.S. Cl.  
CPC ............. *B60G 7/02* (2013.01); *B60G 7/001* (2013.01); *B60G 11/26* (2013.01);  
(Continued)

(58) Field of Classification Search  
CPC .......... B60G 7/02; B60G 7/001; B60G 11/26; B60G 2206/82; B60G 2204/126;  
(Continued)

(56) References Cited

U.S. PATENT DOCUMENTS

2007/0145702 A1   6/2007   Booher

FOREIGN PATENT DOCUMENTS

DE   102008061190 A1   6/2010  
DE   102011103847 A1   12/2011  
(Continued)

OTHER PUBLICATIONS

Drewes, May 2013, DE-102011086481-A1, Machine Translation of Specification.*

(Continued)

*Primary Examiner* — Drew J Brown  
*Assistant Examiner* — Matthew Joseph Ganci  
(74) *Attorney, Agent, or Firm* — Price Heneveld LLP (57) ABSTRACT

A steering system includes a base body having a contact surface on a base body side and a bearing area for pivotable suspension of a first distal end and a retaining element having a contact surface on a retaining side and a fastening section for fastening a spring element, and that is arranged at an end of the base body and fixed to the base body by an adhesive between the contact surfaces, and/or wherein an axle body with a contact surface on the axle side, wherein the base body is fixed to the axle body by an adhesive introduced between the contact surfaces, wherein the retaining element is fixed to the axle body by an adhesive introduced between the contact surface on the axle side and the contact surface on the retaining side.

21 Claims, 5 Drawing Sheets

(52) U.S. Cl.
CPC .. *B60G 2206/7102* (2013.01); *B60G 2206/72* (2013.01); *B60G 2206/82* (2013.01)

(58) Field of Classification Search
CPC ........ B60G 2204/148; B60G 2206/821; B60G 2300/026; B60G 2300/042; B60G 7/008; B60G 7/005; B60G 7/006
See application file for complete search history.

(56) References Cited

FOREIGN PATENT DOCUMENTS

| | | | | |
|---|---|---|---|---|
| DE | 102011086481 A1 * | 5/2013 | ........... | B60G 21/051 |
| DE | 102013003301 A1 | 8/2014 | | |
| DE | 102014005023 A1 | 10/2015 | | |
| DE | 102014218159 A1 | 3/2016 | | |
| DE | 102015117757 A1 | 4/2017 | | |
| DE | 102016102289 A1 | 8/2017 | | |
| DE | 102005038274 C5 | 1/2018 | | |
| EP | 1197359 A1 * | 4/2002 | ........... | B60G 11/113 |
| EP | 1197359 A1 | 4/2002 | | |
| EP | 1036680 B1 | 11/2006 | | |
| WO | 2004054825 A2 | 7/2004 | | |

OTHER PUBLICATIONS

VanRyckegheim, Apr. 2002, EP-1197359-A1, Machine Translation of Specification.*
European Patent Office; International Search Report; dated Apr. 26, 2021; entire document.

* cited by examiner

STEERING SYSTEM

BACKGROUND OF THE INVENTION

The present invention relates to a steering system, in particular for use in commercial vehicles.

Such steering systems, in particular consisting of a trailing arm which is pivotally mounted on the frame of a vehicle and corresponding spring means, such as air springs or steel springs, are known from the prior art. In prior art steering systems, welded or screwed connections are mostly used to fix individual components of a trailing arm to each other or to a chassis arrangement. Welded bonds in particular have the disadvantage that they are very expensive to produce and can only be produced between components made of essentially the same metallic material. Furthermore, welded bonds often cause material stresses which can impair and deteriorate the overall strength of the welded component. Bolted bonds are usually not weight-optimised with regard to the additional material required. In screwed bonds, there are also locally highly stressed zones in the area of the screws and nuts as well as in the area of the components that are screwed together, which can cause local material cracks and can have too short a service life, especially in the case of periodic continuous stress.

It is an object of the present invention to provide a steering system in which the components of the steering can be connected to one another in a particularly favourable manner and thus a flexible steering system can be provided.

SUMMARY OF THE INVENTION

According to a first aspect of the invention, the steering system comprises a base body and a retaining element, wherein the base body has a contact surface on the base body side and the retaining element has a contact surface on the retaining side, wherein the base body has a bearing area for a pivotable suspension at its first distal end, wherein the contact surface on the base body side is arranged at the end of the base body opposite the first distal end, wherein the retaining element has a fastening section for fastening a spring element. In a first variant of the invention, the retaining element can be fixed or is fixed to the base body by means of an adhesive introduced between the contact surface on the base body side and the contact surface on the retaining side. Alternatively or additionally according to a second variant of the invention, an axle body with a contact surface on the axle side is provided, wherein the base body can be fixed or is fixed to the axle body by means of an adhesive introduced between the contact surface on the base body side and the contact surface on the axle side, wherein the retaining element can be fixed or is fixed to the axle body by means of an adhesive introduced between the contact surface on the retaining side and the contact surface on the axle side. The steering system according to the invention is characterised in particular by a base body and a retaining element to be fixed to this base body. The base body is advantageously the steering arm or trailing arm of a chassis system and is pivotably fixable to the frame of the commercial vehicle in its bearing area, which is preferably designed as a bearing bush. Furthermore, the base body is preferably designed to hold an axle body and to absorb deflection movements from the axle body and to position the axle body relative to the frame of the vehicle. Furthermore, the steering system has a retaining element which is manufactured as a component separate from the base body and is fixed to the base body and/or the axle body by means of an adhesive. The axle body is usually a rigid axle tube which is substantially hollow and has a substantially constant circular or rectangular cross-section. The retaining element is often referred to as a "tail end" and is used in particular to support or fix a spring element, in particular an air spring, to the steering system. The advantage of a separate design of the retaining element from the basic body is that one and the same basic body can be used for different types of chassis and the retaining element for fastening the spring can be selected individually and adapted to the respective vehicle type and can be fixed in a simple manner to the basic body or to the axle body. This results in very low manufacturing costs for the individual components of the steering system, since the more solid base body can be used uniformly and the steering system can be used for a large number of vehicles, in particular commercial vehicles, through the variation of the respective retaining element types, which have a lower overall weight and smaller extensions. The base body and the retaining element can be joined together directly, i.e. by bonding the contact surfaces on the base body and the retaining element directly to each other. Alternatively or additionally, an indirect fastening of the base body to the retaining element can be provided via an axle body arranged in between, whereby the base body with its contact surface on the base body side and the retaining element with its contact surface on the retaining element side each come into contact with a contact surface on the axle side and are fixed there with a material bond by means of an adhesive. These two basic fastening possibilities of the retaining element to the base body allow a large variety of variants and, in particular, a relatively free positioning of the axle body either on the base body or in the interface area between the retaining element and the base body, which allows an advantageously large freedom of design and thus an advantageous variability of the steering system. In contrast to the steering systems known from the state of the art, it is not necessary to produce a welded connection or a complex and weight-intensive screw connection to fix a retaining element to the base body, and a steering system consisting of a base body and a variably selectable retaining element can thus be produced in a material-saving and weight-optimised manner.

In a preferred embodiment, an adhesive bond can be produced or is produced between the base body and the retaining element and between the base body and the axle element and between the retaining element and the axle element by means of the adhesive. Advantageously, the axle element is thus arranged in the interface area between the base body and the retaining element, whereby contact surfaces are formed both on the base body and on the retaining element, which enable bonding directly between the base body and the retaining element and in each case further bonding additionally with the axle element. Advantageously, the contact surfaces are arranged in such a way that when the retaining element and the base body are loaded during operation of the commercial vehicle, tensile forces occur, in particular perpendicular to the contact surface, which cause a normal load on the adhesive bond, which is made possible particularly effectively by the adhesive force applied by the adhesive. In this way, a particularly firm connection can be achieved exclusively by means of the adhesive for fastening the base body to the retaining element and the axle element to at least one of the base body and retaining element.

Particularly preferably, at least one of the contact surfaces has a roughness depth of 100 to 200 µm, preferably of approx. 150 to 170 µm. In particular, the surface quality of the contact surfaces has a roughness depth of 100 to 200 µm, which allows a particularly effective and firm adhesive bond to be achieved on the contact surfaces. It has been shown that with a roughness depth of 150 to 170 μm a favourable compromise can be achieved between a sufficiently low manufacturing effort and a sufficient adhesive effect between the surface of the component and the adhesive. In this way, the object of the present invention of producing a cost-effective and strong bond could be best solved in this roughness range.

Advantageously, the base body is formed from a different material than the retaining element. In particular, due to the material connection of the base body with the retaining element by means of an adhesive, the base body can be formed from a different material than the retaining element. In particular, a forged steel component can be used for the retaining element, while the base body is made of aluminium, for example. Alternatively, the base body can be made of a fibre composite material and the retaining element can be made of a light metal or also of a fibre composite material, which is made of a different matrix material than that of the base body, for example. Thanks to the bonding of the retaining element and the base body, a large variety of materials can be selected for the base body and the retaining element.

Furthermore, the contact surface on the base body side and the contact surface on the retaining side are preferably of different sizes, so that the retaining element can be fixed at a plurality of different positions on the base body and/or the axle body. In particular, when the base body is fixed directly to the retaining element via the contact surface on the base body side and the contact surface on the retaining side, it is advantageous if one of these contact surfaces is larger than the other, in particular preferably has a greater width and/or a greater height. In this way, the smaller contact surface in each case can be arranged at different points on the larger contact surface of the other element in each case. This allows a selection of one of a number of different fastening positions of the retaining element relative to the base body or relative to the axle body. This serves in particular to adjust different track widths and in particular to adapt the fastening possibility for the spring element, which is to be fixable to the retaining element, to the respective chassis and thus to provide space-optimised steering systems. In an alternative embodiment, either the contact surface on the base body side or the contact surface on the retaining element side, or both contact surfaces, are smaller than the contact surface on the axle side, so that the base body can be fixed at different points on the axle body and/or the retaining element can also be fixed in different positions on the axle body.

In a preferred embodiment, the contact surface on the base body side is larger than the contact surface on the retaining side, wherein the height and/or the width of the contact surface on the base body side is 1.2 to 4 times and advantageously 1.5 to 2.5 times the corresponding height and/or width of the contact surface on the retaining side. The width of the respective contact surface is advantageously measured parallel to the main extension axis of the axle body or to the rotation axis of the vehicle wheels that can be fixed to the axle body. The height of the respective contact surface is preferably measured perpendicular to this width and thus perpendicular to the axis of rotation of the wheels or to the main axis of extension of the axle body. The ratio of the height or width of the contact surface on the base body side to the contact surface on the retaining side of 1.2 to 4 results in a multitude of different fastening positions of the retaining element on the base body. A variation at least in the width can be used to adjust the track and the fastening position of the spring element relative to the track width. A variation in height can be used to be able to fix different sized spring elements to the retaining element. It has been shown that the narrower range of 1.5 to 2 as the ratio between the respective height and/or the respective width of the contact surface on the base body side and the contact surface on the retaining side is sufficient for use in commercial vehicles and thus a smaller oversize of the contact surface on the base body side to the contact surface on the retaining side is achieved, which in turn can save weight and installation space.

In a particularly preferred embodiment, the base body has an engagement section on the base body side adjacent to or in the region of the contact surface on the base body side, wherein the retaining element has an engagement section on the retaining side adjacent to or in the region of the contact surface on the retaining side, wherein between the engagement section on the base body side and the engagement section on the retaining side, a preferably direct form fit can be produced which secures the base body and the retaining element against displacement relative to one another in at least two directions. To support the adhesive bond between the base body and the retaining element, an engagement section can preferably be provided on both the base body and the retaining element in the area of the contact surfaces or adjacent to the contact surfaces, which absorbs additional loads. Furthermore, by hooking or suspending the retaining element on the base body during assembly of the steering system, a position lock can be created which holds the two elements in position relative to each other during the period of curing of the adhesive and can also absorb moments and forces acting on the adhesive surface thereafter. The engagement sections preferably form a directly interacting undercut in such a way that, for example, the base body and the retaining element can be hooked together after adhesive has been applied to the respective contact surfaces and thus the duration until the adhesive has completely cured can be bridged. Advantageously, the engagement sections on the base body and on the retaining element are formed above the other contact surfaces, on which a bond has been produced, in relation to the force of gravity. In this way, when a force is applied to the fastening section of the retaining element by a spring element, the bending moment acting in the area of the interface between the base body and the retaining element can be supported, in particular by the engagement section. Alternatively or additionally preferably, at least one engagement section can also be arranged adjacent to and spaced by one or a few centimetres from the nearest contact surface. The arrangement of engagement sections in the area of or adjacent to the contact surfaces thus enables, on the one hand, easier assembly of the steering system and, on the other hand, greater strength of the steering system in use.

Particularly preferably, the adhesive is a two-component adhesive. Two-component adhesives have proven themselves in particular with regard to ease of manufacture, manageability and the high strength that can be achieved. It is advantageous if an epoxy resin-based two-component adhesive is used. In particular, when using fibre composites to manufacture the base body and/or the retaining element, epoxy resin-based two-component adhesives are characterised by a particularly strong atomic bond between the adhesive and the respective fibre composite parts.

In a particularly preferred embodiment, the contact surface on the base body side and the contact surface on the retaining side are curved. The curvature of the contact surface on the base body side and/or the contact surface on the retaining side enables, on the one hand, a particularly favourable fastening of the respective component to the preferably curved axle body. On the other hand, if both the contact surface on the base body side and the contact surface on the retaining side are curved and these two components are fixed directly to each other, not only the height and the axial position of the retaining element relative to the base body can be adjusted, but also a corresponding pivoting of the retaining element can be achieved to suit the respective fastening position on the base body. In this way, a more favourable adaptation of the fastening position of the retaining element on the chassis system can be achieved, whereby at the same time the corresponding spring-in direction of a spring element, preferably an air spring, is also taken into account accordingly.

Preferably, the contact surface on the base body side and/or the contact surface on the retaining side are formed as a partial surface of the circumferential surface of a cylinder and span an arc angle of at most 180°, advantageously at most 170° about the cylinder axis. The contact surface on the base body side and/or the contact surface on the retaining side thus enclose the axle body, in particular not in the area of its contact surface on the axle side. This means that both the base body and/or the retaining element can be brought up to the side of the axle body and glued to it, which greatly simplifies the assembly of the steering system and increases its flexibility. With an arc angle of 180°, the largest possible bonding surface is available for bonding to the axle tube. The smaller angle of 170° allows the axle tube to be pressed together with at least one of the base body or retaining element, whereby elastic deformation during pressing together can be compensated by a gap between the retaining element and the base body.

BRIEF DESCRIPTION OF THE DRAWINGS

Further advantages and aspects of the present invention will be apparent from the following description with reference to the accompanying figures. It shows.

DETAILED DESCRIPTION OF THE PREFERRED EMBODIMENTS

Figure 1:
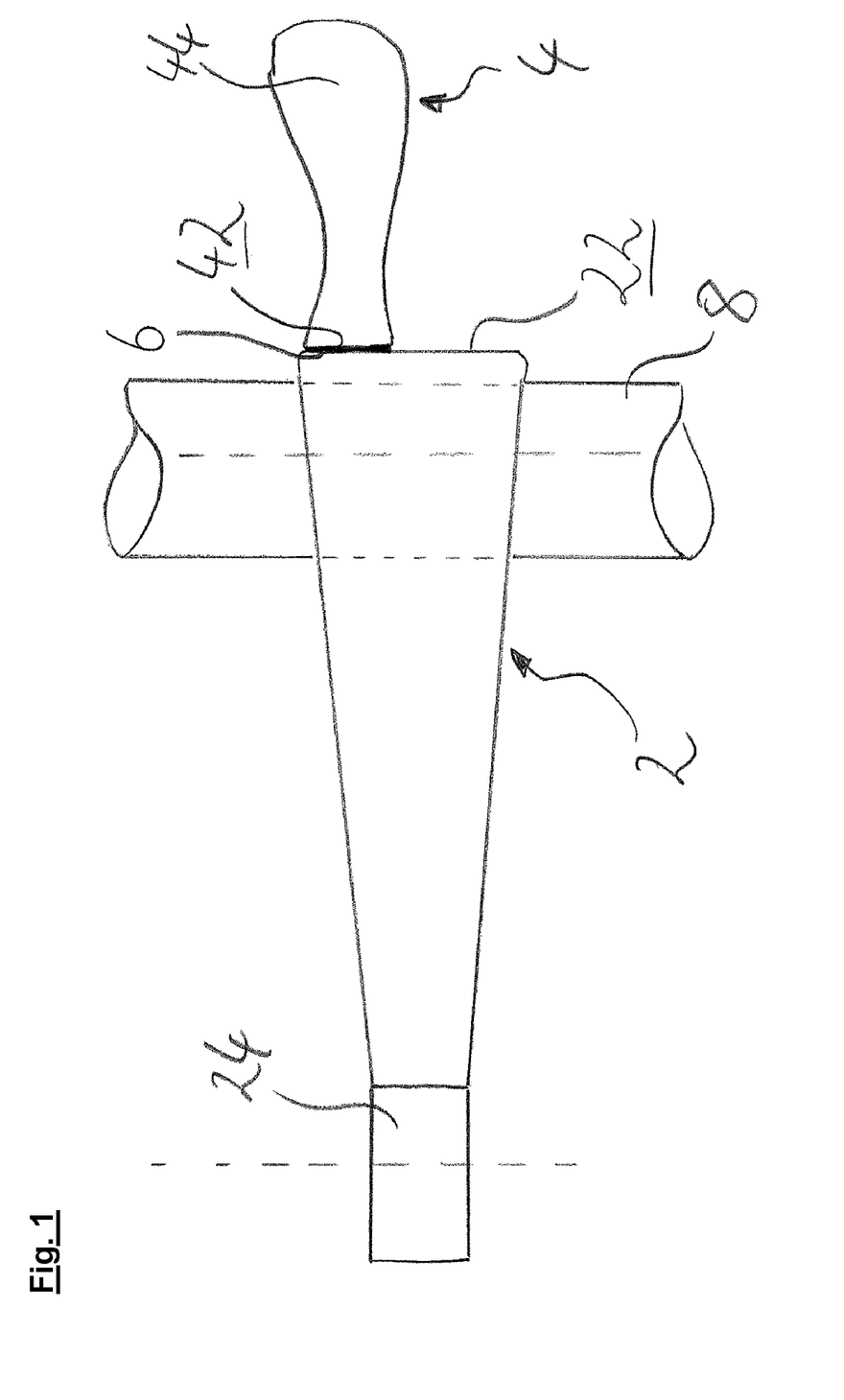
FIG. 1 is a first preferred embodiment of the steering system according to the invention.

In the steering system shown in FIG. 1, the axle body 8 is fixed directly to the base body 2. In this embodiment, there is therefore no adhesive bond between the axle body 8 and the retaining element 4. Instead, the retaining element 4 is arranged directly on the base body 2 and the contact surface 22 on the base body side arranged on the base body 2 via the contact surface 42 on the retaining side, where it is firmly glued. The adhesive 6 is arranged in particular in the region between the contact surface 22 on the base body side and the contact surface 42 on the retaining side. Furthermore, at its distal end shown in the figure on the left, the base body 2 has a bearing area 24 for pivotable mounting on the frame of a commercial vehicle. Furthermore, the retaining element 4 has a fastening section 44 for fastening a spring element (not shown). The fastening section 44 of the retaining element 4 is preferably plate-shaped, so that a spring element can preferably be placed over the entire surface of the retaining element and fixed thereto. In the embodiment shown in FIG. 1, the contact surface 22 on the base body side has a significantly larger width than the contact surface 42 on the retaining side. In the preferred embodiment shown in FIG. 1, the width of the contact surface 22 on the base body side is preferably 2.5 to 3 times as large as the width of the contact surface 42 on the retaining side, which enables a large number of different fastening positions of the retaining element 4 on the base body 2.

Figure 2:
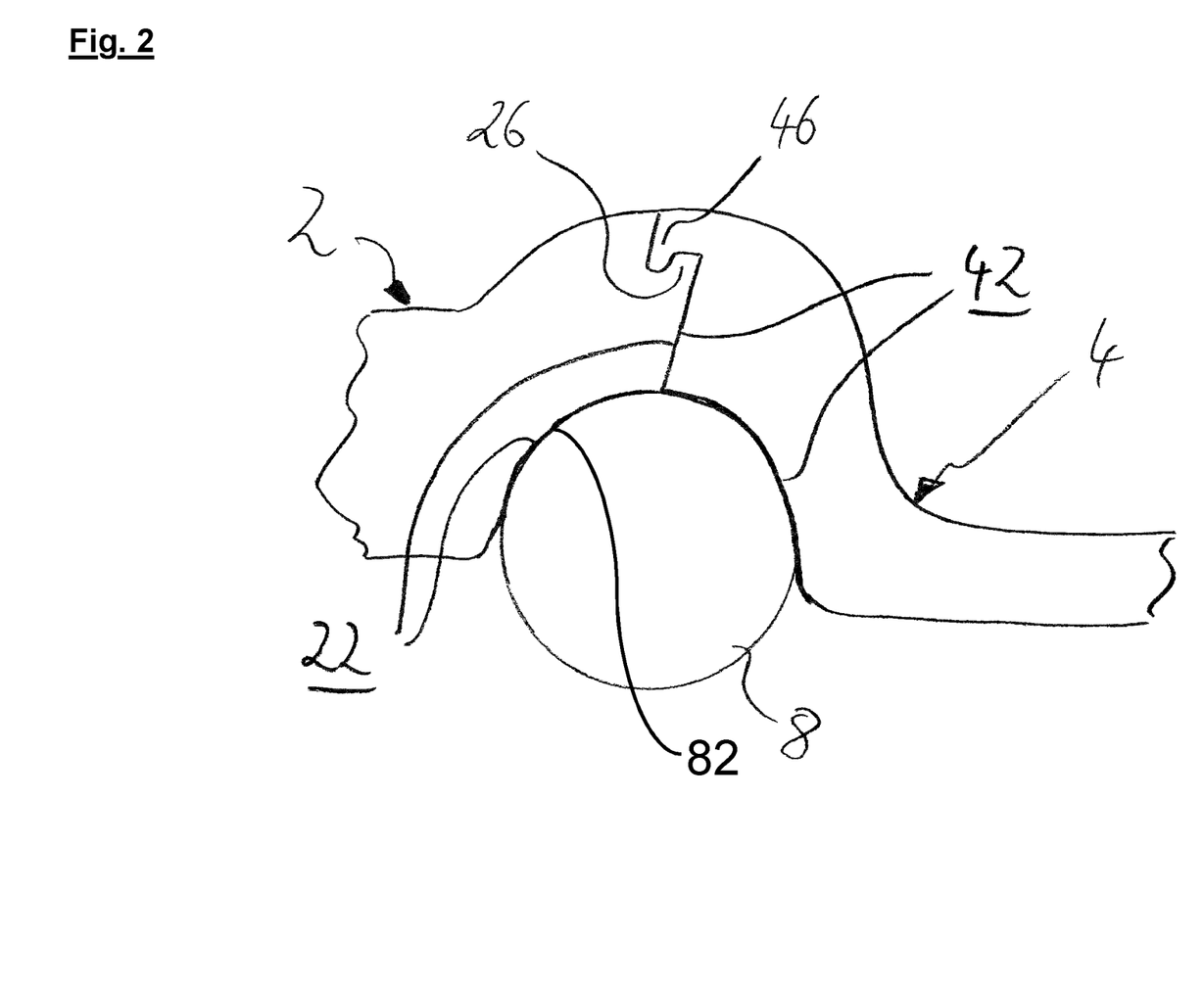
FIG. 2 is a further preferred embodiment of the steering system according to the invention.

FIG. 2 shows a further preferred embodiment of the interface area between the base body 2, the retaining element 4 and an axle body 8. Here, on the one hand, the base body 2 is both directly materially bonded to the retaining element 4 and also directly materially bonded to the axle body 8 via a contact surface 82 on the axle side. Likewise, the retaining element 4 is also bonded to the axle body 8, in particular at its contact surface 82 on the axle side. In addition to the adhesive bonds between the components formed between the contact surfaces 22, 42 on the base body side and on the retaining side, an engagement section 26 is formed on the base body side and an engagement section 46 is formed on the retaining side of the retaining element 4. In the state shown in FIG. 2, the engagement sections 26, 46 are already hooked into one another, so that there is a positive fastening of the retaining element 4 to the base body 2, which is produced in particular by the undercut between the hook-shaped engagement sections 26, 46. It is understood that the formation of engagement sections according to the embodiment shown in FIG. 2 can also be used in the example of FIG. 1, where the contact surface on the retaining side and the contact surface 22, 42 on the base body side are formed directly against each other and there is no connection between the retaining element and the axle body 8.

Figure 3:
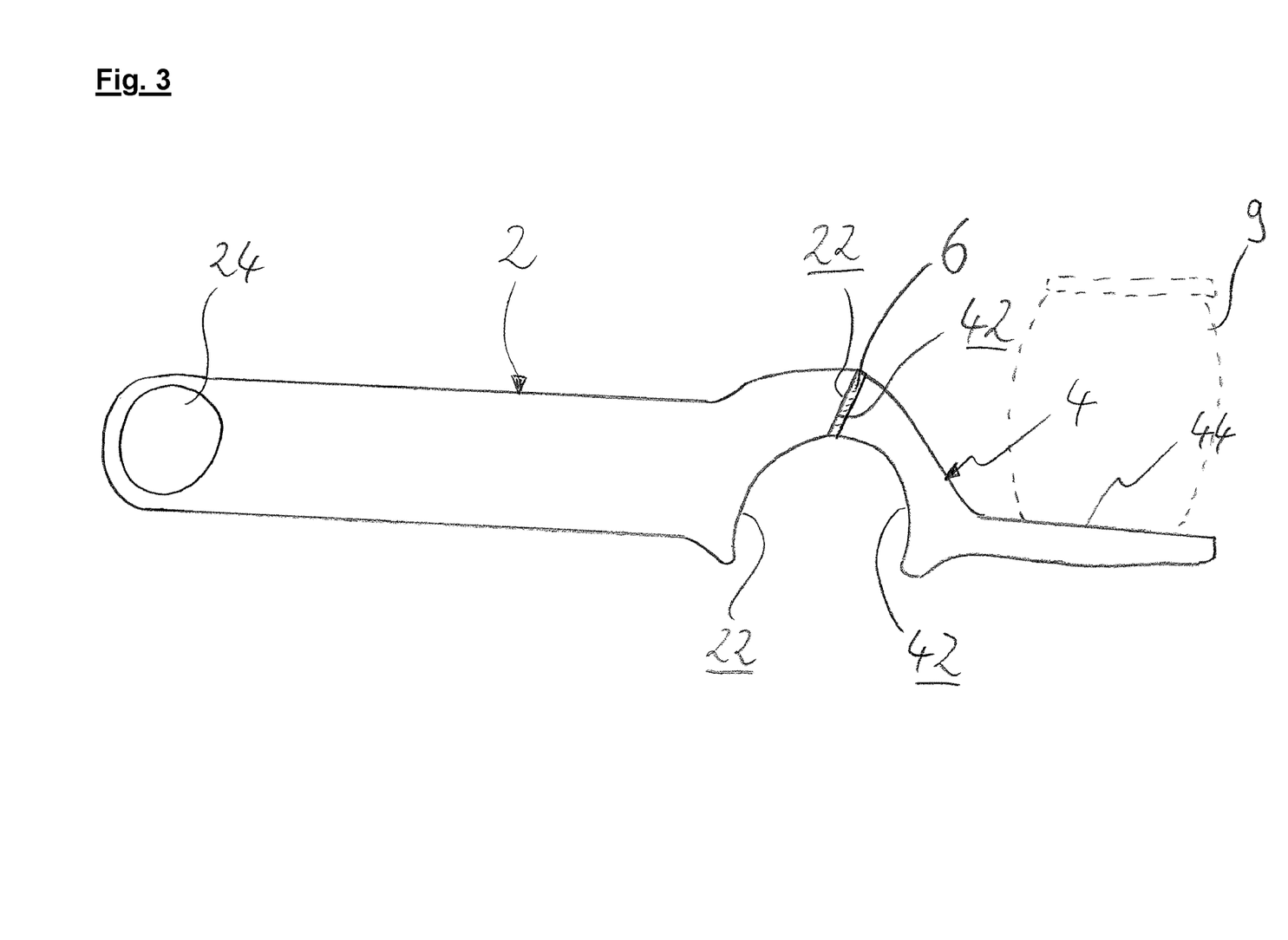
FIG. 3 is a further preferred embodiment of the steering system according to the invention.

FIG. 3 shows a further preferred embodiment of the steering system according to the invention. Initially, only the composite of the base body 2 and the retaining element 4 is shown, which are fixed to each other by means of an adhesive bond between the contact surface 22 on the base body side and the contact surface 42 on the retaining side by means of an adhesive 6 applied there. Between the base body 2 and the retaining element 4 is the rounded receiving geometry for the axle body 8, which is not shown in FIG. 3, whereby contact surfaces 22, 42 are also provided there, on which an additional fastening can take place. Furthermore, the spring element 9 is shown as an example and dashed, which can be arranged on the fastening section 44 of the retaining element 4. FIG. 3 shows the preferred feature that the base body 2 has a considerably greater extension than the retaining element 4. The base body 2 thus ensures a correspondingly advantageous spacing of the axle body 8 from the pivotable suspension on the frame of the commercial vehicle.

Figure 4:
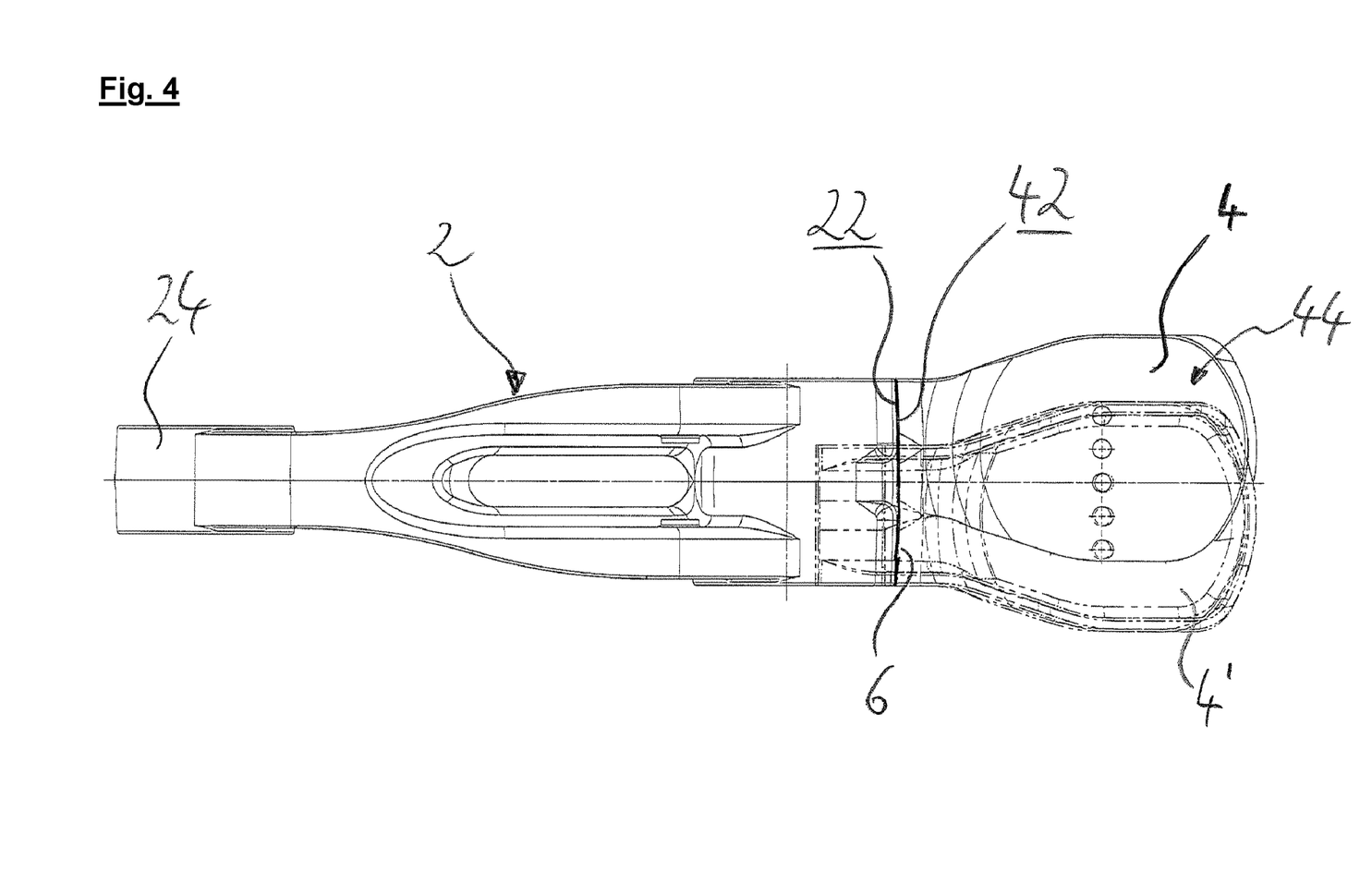
FIG. 4 is a further preferred embodiment of the steering system according to the invention.

FIG. 4 shows a top view of a preferred embodiment of the steering system according to the invention, whereby a retaining element 4 is shown in a first preferred fastening position on the base body 2. The reference line 4' shows an alternative fastening position of the retaining element 4 on the base body 2. Furthermore, it is shown that the contact surface 22 on the base body side and the contact surface 42 on the retaining side are slightly curved, whereby the radius of curvature is significantly larger than the distance between the contact surface 22 on the base body side and the bearing area 24. Due to the slight curvature, an advantageous slight pivoting of the retaining element 4 from its first fastening position to its second fastening position 4' can be produced.

Figure 5:
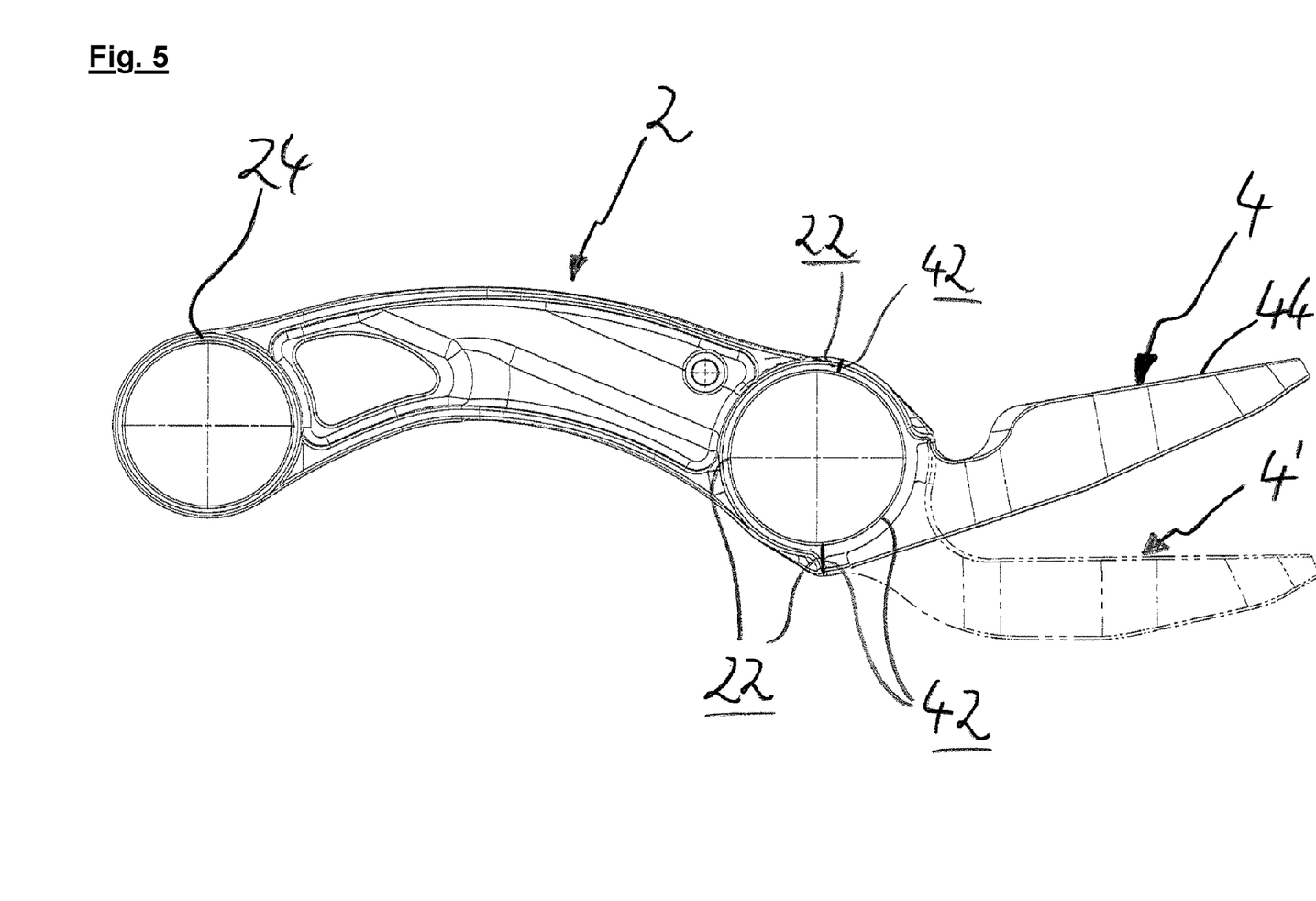
FIG. 5 is a further preferred embodiment of the steering system according to the invention.

FIG. 5 shows a further preferred embodiment, whereby a vertical displacement of the retaining element 4 can be selected from a first preferred fastening position to an alternatively selectable second fastening position, shown with the reference sign 4'. On the one hand, this allows the height of the fastening section 44 to be adjusted relative to the bearing area 24 on the base body 2 and thus to the frame of the vehicle to which it can be fastened. On the other hand, a corresponding pivoting of the fastening section 44 between the two fastening positions is achievable, whereby the position of the fastening section 44 can be optimally aligned for the spring axis of the spring element 9. It is understood that this embodiment can also be combined with the selection of a fastening position selected along the main extension axis of the axle body 8 shown in FIG. 1 or 4, so that the retaining element 4 can be arranged both offset or pivoted in the vertical direction and can be fixed in a horizontal, i.e. essentially parallel to the main extension axis of the axle body 8, offset in a respectively determined fastening position on the base body 2.

REFERENCE LIST 2 base body
4 retaining element
6 adhesive
8 axle body
9 spring element
22 contact surface on the base body side
24 bearing area
26 engagement section on the base body side
42 contact surface on the retaining side
44 fastening section
46 engagement section on the retaining side
82 contact surface on the axle side

The invention claimed is:

1. A steering system, comprising:
a base body and a retaining element separate from the base body;
wherein the base body includes a steering arm or trailing arm of a vehicle chassis;
wherein the retaining element includes a distal end configured to support a spring element;
wherein the retaining element is separate from the base body and the retaining element is fixed to the base body and an axle body;
wherein the base body has a contact surface on a base body side and the retaining element has a contact surface on a retaining side;
wherein the base body has a bearing area for a pivotable suspension at a first distal end of the base body;
wherein the contact surface on the base body side is arranged at an end of the base body opposite the first distal end;
wherein the retaining element has a fastening section configured to fasten the spring element;
wherein an axle body with a contact surface on the axle side is provided, the base body is fixed directly to the axle body by adhesive introduced between the contact surface on the base body side and the contact surface on the axle side, and the retaining element is configured to be fixed or is fixed to the axle body by an adhesive introduced between the contact surface on the axle side and the contact surface on the retaining side; and
wherein an adhesive bond is produced between the base body and the retaining element and between the base body and the axle element and between the retaining element and the axle element by the adhesive.

2. The steering system according to claim 1, wherein an adhesive bond is produced between the base body and the retaining element and between the base body and the axle element and between the retaining element and the axle element by the adhesive.

3. The steering system according to claim 2, wherein at least one of the contact surfaces has a roughness depth of 100 μm to 200 μm.

4. The steering system according to claim 3, wherein the roughness depth is about 150 μm to about 170 μm.

5. The steering system according to claim 3, wherein the base body comprises a different material than the retaining element.

6. The steering system according to claim 5, wherein the base body comprises aluminum, and wherein the retaining element comprises plastic or steel.

7. The steering system according to claim 6, wherein the contact surface on the base body side is larger than the contact surface on the retaining side, and wherein a height and/or a width of the contact surface on the base body side is 1.2 to 4 times a corresponding height and/or a corresponding width of the contact surface on the retaining side.

8. The steering system according to claim 7, wherein the height and/or the width of the contact surface on the base side is 1.5 to 2.5 times the corresponding height and/or the corresponding width of the contact surface on the retaining side.

9. The steering system according to claim 7, wherein the base body has an engagement section on the base body side adjacent to or in the region of the contact surface on the base body side, wherein the retaining element has an engagement section on the retaining side adjacent to or in the region of the contact surface on the retaining side, and wherein between the engagement section on the base body side and the engagement section on the retaining side, a direct form fit secures the base body and the retaining element against displacement relative to one another in at least two directions.

10. The steering system according to claim 9, wherein the adhesive comprises a two-component adhesive.

11. The steering system according to claim 10, wherein the contact surface on the base body side and the contact surface on the retaining side are each curved.

12. The steering system according to claim 1, wherein the contact surface on the base body side and/or the contact sur-face on the retaining side are formed as a partial surface of the circumferential surface of a cylinder and span an arc angle of at most 180°, about the cylinder axis.

13. The steering system according to claim 12, wherein the arc angle is at most 170°.

14. The steering system according to claim 1, wherein at least one of the contact surfaces has a roughness depth of 100 μm to 200 μm.

15. The steering system according to claim 1, wherein the base body comprises a different material than the retaining element.

16. The steering system according to claim 15, wherein the base body comprises aluminum, and wherein the retaining element comprises plastic or steel.

17. The steering system according to claim 1, wherein the contact surface on the base body side is larger than the contact surface on the retaining side, and wherein a height and/or a width of the contact surface on the base body side is 1.2 to 4 times a corresponding height and/or a corresponding width of the contact surface on the retaining side.

18. The steering system according to claim 1, wherein the base body has an engagement section on the base body side adjacent to or in the region of the contact surface on the base body side, wherein the retaining element has an engagement section on the retaining side adjacent to or in the region of the contact surface on the retaining side, and wherein between the engagement section on the base body side and the engagement section on the retaining side, a direct form fit secures the base body and the retaining element against displacement relative to one another in at least two directions.

19. The steering system according to claim 1, wherein the adhesive comprises a two-component adhesive.

20. The steering system according to claim 1, wherein the contact surface on the base body side and the contact surface on the retaining side are each curved.

21. A steering system, comprising:
- a base body and a retaining element separate from the base body;
- wherein the base body comprises a steering arm or trailing arm of a vehicle chassis;
- wherein the retaining element includes a distal end configured to support a spring element;
- wherein the retaining element is separate from the base body and the retaining element is at least one of fixed to the base body and configured to be fixed to an axle body;
- wherein the base body has a contact surface on a base body side and the retaining element has a contact surface on a retaining side;
- wherein the base body has a bearing area for a pivotable suspension at a first distal end of the base body;
- wherein the contact surface on the base body side is arranged at an end of the base body opposite the first distal end;
- wherein the retaining element has a fastening section configured to fasten the spring element; and
- wherein the retaining element is fixed directly to the base body by an adhesive introduced between the contact surface on the base body side and the contact surface on the retaining side, and the contact surface on the base body side and the contact surface on the retaining side are of different sizes so that the retaining element can be fixed at a plurality of different positions on the base body.

* * * * *